Patented Dec. 11, 1951

2,578,169

UNITED STATES PATENT OFFICE 2,578,169

COPOLYMERS OF AN ETHYLENICALLY UN-SATURATED COMPOUND WITH A POLY-OLEFINIC CYCLIC HYDROCARBON

Herman S. Bloch, Chicago, Ill., assignor to Universal Oil Products Company, Chicago, Ill., a corporation of Delaware No Drawing. Application November 24, 1948, Serial No. 61,921

9 Claims. (Cl. 260—78.5)

This application is a continuation-in-part of my co-pending applications Serial Numbers 574,824 and 574,825 filed January 26, 1945, now abandoned.

This invention relates to resinous materials and methods for their production. More particularly, the invention is directed to new compositions which comprise the reaction product of a polymerizable unsymmetrical ethylenic compound containing at least one strongly electronegative group and a polyolefinic cyclic hydrocarbon fraction recovered from the catalyst layer resulting from the treatment of an olefin-acting compound with a conjunct polymerization catalyst.

An object of this invention is to provide a new class of resinous compounds suitable for use in coating compositions, molding plastics, adhesives, and the like.

A further object of this invention is to provide a method for manufacturing novel resinous materials which range from semi-solid products to hard, clear resins.

In one specific embodiment, this invention relates to a resinous material comprising the copolymerization product of an ethylenic compound containing at least one strongly electronegative group attached to a carbon atom selected from the members of the group consisting of an ethylenic carbon atom and a carbon atom in alpha position to an ethylenic carbon atom with a polyolefinic cyclic hydrocarbon fraction recovered from the catalyst layer resulting from the treatment of an olefin-acting compound with a conjunct polymerization catalyst at a temperature of from about 10° to about 150° C.

Broadly, my invention is directed to the preparation of resinous materials which comprise copolymers of polyolefinic cyclic hydrocarbon fractions and unsymmetrical ethylenic compounds containing electronegative substituents joined to an ethylenic carbon atom or to a carbon atom in alpha position to an ethylenic carbon atom.

Although investigators differ as to the exact order of relative electronegativity of different substances and groups, they are in general agreement as to which groups are strongly electronegative and which are more weakly electronegative in character. The strongly electronegative substituents, when attached to one of the carbon atoms of an ethylenic group tend to increase the activity of the ethylenic group to which they are attached. When the strongly electronegative substituent is attached to a carbon atom which is in alpha position to the ethylenic group, the activity of the group is likewise increased but to a lesser extent than is true when the electronegative substituent is attached directly to an ethylenic carbon atom. The reactivity of materials containing the strongly electronegative substituent attached to the alpha carbon atom, however, is greater than that of those ethylenic compounds which have no electronegative group at all. For example, allyl esters are less reactive than vinyl esters, but more reactive than propylene in polymerization reactions. The introduction of chlorine on a carbon atom in alpha position to the ethylenic group serves to increase the reactivity of the resulting compound so that it undergoes polymerization much more easily than the corresponding hydrocarbon. Similarly, the substitution of the strongly electronegative phenyl group for a hydrogen atom on the alpha atom tends to activate the ethylenic double bond. A similar effect may be observed with other strongly electronegative elements such as those selected from groups V, VI, and VII of the periodic table and particularly those having an atomic number less than 18, namely, nitrogen, oxygen, fluorine, phosphorus, sulfur, and chlorine; or with other strongly electronegative organic radicals, for example, aromatic hydrocarbon radicals and substituted aromatic radicals. Asymmetry in the substituted ethylene compound appears to be an important requisite, while the presence of a terminal methylene group as one of the constituents of the ethylenic compound likewise appears to facilitate polymerization. These principles have been utilized in the preparation of the resins of my invention wherein a substituted cyclic polyene is reacted with an ethylenic compound containing an electronegative group which is directly attached to an ethylenic carbon atom or to a carbon atom in alpha position to an ethylenic carbon atom.

When hydrocarbons are reacted in the presence of a catalyst such as, for example, anhydrous hydrogen fluoride, concentrated sulfuric acid, or anhydrous aluminum chloride, which promotes conjunct polymerization reactions under carefully controlled conditions of reaction, the used catalyst phase can be made to contain certain valuable materials including a major proportion of cyclic polyolefinic hydrocarbons having a high degree of conjugated unsaturation. This material which can be recovered from the catalyst phase is referred to in this specification as a polyolefinic cyclic hydrocarbon fraction containing an average of from about 2.5 to about 4 double bonds per molecule, with from about 40 to about 70% of said double bonds being conjugated.

The complex series of reactions herein referred to in the aggregate as a "conjunct polymerization reaction" comprises an initial polymerization and condensation reaction between the olefinic hydrocarbons or other olefin-acting starting material followed by cyclization and isomerization of polymers and condensation products, accompanied by a hydrogen transfer reaction between the organic compounds or conjunct polymers present in the reaction mixture whereby a portion of said polymers is converted into saturated hydrocarbons by virtue of the hydrogen transfer at the expense of other components which are converted into highly unsaturated organic compounds containing on an average from about 2.5 to about 4 double bonds per molecule of which from about 40 to about 70% are conjugated. The resulting unsaturated conjunct polymers, comprising a series of high molecular weight polyolefinic cyclic compounds become attached by weak chemical bonds to the catalyst to form a sludge-like complex addition product in which fluorine (in the case of a hydrogen fluoride catalyst) is not, however, organically bound, since it can be substantially all removed by treatment of the complex with water or cold aqueous alkali. The saturated hydrocarbon conjunct polymers form an insoluble phase which upon standing of the reaction mixture separates as a distinct upper layer as hereinabove referred to. Since the formation of unsaturated conjunct polymers is dependent upon the presence of hydrogen acceptors in the reaction mixture, it also follows that the proportion of hydrogen acceptors to hydrogen donors influences the total unsaturation of the polyolefinic conjunct polymers formed as well as their yield from given weights of olefin-acting compounds or olefinic hydrocarbon starting materials.

The olefin-acting compounds used as starting materials in this process comprise normally gaseous and normally liquid monoolefinic hydrocarbons, a certain polyolefinic hydrocarbons such as butadiene or divinylbenzene, certain highly branched and readily cracked paraffins which easily yield olefins on cracking, and the like.

For authoritative use of the term "conjunct polymerization," reference is made to the following publications: Ipatieff, "Catalytic Reactions at High Pressures and Temperatures" (MacMillan Company, New York, 1936), page 612. Berkman, Morrell and Egloff, "Catalysis" (Reinhold Publishing Company, 1940), page 606. Ipatieff and Pines, J. Org. Chem. 1, 465 (1936). Ipatieff et al., J. Am. Chem. Soc., 58, 917 (1936).

Study of the ultra-violet and infra-red absorption spectra and other properties of hydrocarbon materials recovered from hydrogen fluoride sludges that have been used in promoting hydrocarbon conversion reactions such as olefin polymerization, alkylation and the like, shows that most of the resultant hydrocarbon condensation products contain a pair of conjugated double bonds with one of these double bonds in a ring of five carbon atoms and the other double bond in an alkenyl side chain, besides additional isolated (i. e. non-conjugated) unsaturation. Thus a cyclopentene ring may be combined with a methylene group or a vinyl group. In the case of the polyolefinic cyclic hydrocarbons recovered from hydrogen fluoride sludges, the cyclopentadiene ring structure, if present at all, is present in only a minor portion of the material. Although the lower-boiling hydrocarbons are monocyclic, the less volatile fractions contain an average of two or more rings per mole; and even these rings appear to be largely five-members rather than of the hydroaromatic type. As a class, the hydrocarbons comprising the unsaturated conjunct polymers may be designated generally as polyolefinic cyclopentenyl hydrocarbons or more specifically as alkenylcyclopentenes.

In both the monocyclic and polycyclic hydrocarbon product formed by conjunct polymerization of a monoolefinic hydrocarbon, the 5-carbon atom ring portion of the molecule is combined with at least two alkyl groups or with two additional unsaturated aliphatic groups. Some of the typical alkenylcyclopentenyl hydrocarbons contained in such conjunct polymerization products formed from polymer gasoline are represented structurally by the following formula:

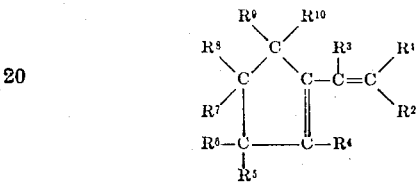

wherein the radicals $R^1$ to $R^{10}$ are selected from the group consisting of hydrogen and alkyl, alkenyl, and alkapolyenyl hydrocarbon radicals, at least two of the substituents $R^4$ to $R^{10}$ are hydrocarbon radicals, and not more than two of the groups $R^1$ to $R^4$ represent hydrogen.

Other constituents of the polyolefinic cyclic hydrocarbon fraction formed from polymer gasoline are believed to have alkenylcyclopentene structures which may be represented by the formula:

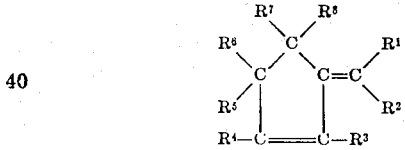

wherein $R^1$ to $R^8$ represent members of the group consisting of hydrogen and alkyl, alkenyl, and alkapolyenyl hydrocarbon radicals, at least two of the substituents $R^3$ to $R^8$ are hydrocarbon radicals, and not more than two of the substituents $R^1$ to $R^4$ are hydrogen.

The polyolefinic cyclic hydrocarbon fraction used as one of the essential starting materials in my process may be formed in the following manner:

An olefinic hydrocarbon or other olefin-acting compound is contacted with a conjunct polymerization catalyst such as concentrated hydrofluoric acid and at conjunct polymerization conditions, the resultant upper saturated hydrocarbon layer is separated from the lower sludge layer, the sludge is decomposed by water hydrolysis, by controlled heating methods or by another suitable means, and the polyolefinic cyclic hydrocarbon fraction is recovered.

In forming the polyolefinic cyclic hydrocarbon fraction, the weight ratio of the hydrogen fluoride catalyst to the olefinic charging stock, that is, to the olefinic hydrocarbon or other olefin-acting compound, will vary from about 0.1 to about 10. When the hydrogen fluoride to organic compound weight ratio is less than about 0.1, it is necessary to recycle excessive amounts of organic compounds in order to obtain good conversion, while increase in this ratio above about 10 causes very little further increase in yield of the desired reaction product but such increased ratio of hydrogen fluoride to total organic reactants does decrease the capacity of the reactor or other treating equipment.

In the present process, the production of the polyolefinic cyclic hydrocarbon fraction is carried out at a temperature of from about 10° to about 150° C., and at a pressure sufficient to maintain the reactants and catalyst in substantially liquid phase. The operating pressure is generally from about 1 to about 100 atmospheres. At these reaction conditions, a vigorously agitated mixture of hydrogen fluoride and olefinic hydrocarbon yields a high proportion of catalyst layer containing polyolefinic cyclic hydrocarbons during a time of from about 1 to about 30 minutes, but the reaction may be continued for a longer time to obtain an increased yield of the unsaturated cyclic hydrocarbon fraction.

Normally gaseous and normally liquid olefinic hydrocarbons are utilizable as charging stocks in the production of the aforementioned polyolefinic cyclic hydrocarbon fractions. The olefinic hydrocarbons preferred as charging stocks for this process have from about 4 to about 12 or more carbon atoms per molecule. Besides olefinic hydrocarbons, other olefin-acting compounds, such as alkanols, alkyl ethers, alkyl esters, alkyl halides, alkyl mercaptans, and the like may be employed following essentially the same procedure as applied to olefinic hydrocarbon charging stocks. These olefin-acting compounds may undergo conversion into olefins as transitory intermediate products, during the reaction in the presence of a conjunct polymerization catalyst. It is of interest to note that in the type of polymerization observed in this process, in which hydrogen transfer occurs, the organic products recovered from the sludge or catalyst layer have higher molecular weights than the charging stock and are generally more unsaturated than the charging stock.

In carrying out the production of the polyolefinic cyclic hydrocarbon fraction used as a starting material in this process, an olefinic hydrocarbon and liquid hydrogen fluoride (as an example of a conjunct polymerization catalyst), generally of from 90 to about 100% HF concentration, are added to a suitable reactor provided with adequate means of agitating the reactor contents and of controlling the temperature therein. Since the condensation, polymerization, and co-polymerization reactions of this process are exothermic, it is generally necessary to cool the reactor in order to maintain the chosen reaction temperature. The olefinic hydrocarbon and/or other olefin-acting compound and hydrogen fluoride catalyst are generally mixed at such rates that substantially all of the organic compounds charged are converted into the saturated, upper hydrocarbon layer and the higher-boiling, highly-unsaturated cyclic hydrocarbon material contained in the hydrofluoric acid catalyst layer. After the desired quantities of organic materials comprising olefinic hydrocarbons, other olefin-acting compounds, or mixtures of these organic materials have been added to the hydrofluoric acid, or after the hydrofluoric acid has been added to the organic material, the agitation or stirring of the reaction mixture is continued for a time sufficient to insure substantially complete conversion of the reactants into saturated hydrocarbons and also polyolefinic cyclic hydrocarbons. The agitation or mixing is then stopped and the reaction mixture is permitted to stand whereby it forms two layers, an upper substantially saturated hydrocarbon layer and a lower hydrogen fluoride layer. The substantially saturated hydrocarbon layer is separated from the lower hydrogen fluoride layer comprising essentially hydrogen fluoride and polyolefinic cyclic hydrocarbons.

As the saturated hydrocarbons of the upper layer boil over about the same range of temperature, as do the constituents of the polyolefinic cyclic hydrocarbon fraction, and as small amounts of the saturated hydrocarbons are entrained or mixed with the hydrogen fluoride lower layer, it is advisable to extract the hydrogen fluoride lower layer with a low-boiling saturated hydrocarbon, preferably a paraffin having from 3 to about 8 carbon atoms per molecule before subjecting the hydrogen fluoride lower layer to hydrolysis or other treatment in order to recover the polyolefinic cyclic hydrocarbon fraction therefrom. From the lower layer, the used hydrogen fluoride and the polyolefinic cyclic hydrocarbon fraction are then separated by suitable means, for example, the lower layer may be added to water or ice whereby the hydrogen fluoride is dissolved in water to form an aqueous solution from which the polyolefinic cyclic hydrocarbon fraction separates as an upper layer. Also the hydrogen fluoride lower layer may be subjected to flash distillation to decompose the hydrocarbon-catalyst complex and substantially vaporize the hydrogen fluoride from the higher-boiling, polyolefinic cyclic hydrocarbon fraction. When the lower layer is separated by distillation methods, the recovered hydrogen fluoride is suitable for recycling to the process to effect reaction of additional quantities of charged olefin-acting compound.

Passage of an inert gas, such as nitrogen, hydrogen, methane, ethane, carbon dioxide, and the like, through the distillation system in which the hydrogen fluoride is being separated from the polyolefinic cyclic hydrocarbons, assists in the recovery of said hydrocarbons. Separation of hydrogen fluoride from the cyclic hydrocarbon fraction in the lower layer is also assisted by carrying out the flash distillation of said lower layer in a tower containing catalytic packing material formed from graphitized carbon or from a metal selected from the members of the group consisting of aluminum, copper, cobalt, lead, cadmium, and an alloy of copper, such as brass, and preferably in the presence of an inert gas to act as a carrier and thus assist in removing the liberated hydrogen fluoride.

Another method of decomposing the hydrogen fluoride sludge layer is to introduce this material into an inert liquid, such as a paraffinic hydrocarbon, or naphtha, contained in a decomposition zone and maintained at an elevated temperature which is approximately the boiling point of the paraffinic naphtha. The decomposition zone or reactor tower may contain a catalytic packing material in the liquid zone of this reactor tower and a substantially inert gas may also be passed therethrough. The hydrogen fluoride so liberated is vaporized, condensed, and conducted to storage, while the inert liquid containing dissolved polyolefinic cyclic hydrocarbons is withdrawn from the decomposition zone, either intermittently or continuously, and replaced by fresh liquid. This liquid should be readily separable from the polyolefinic cyclic hydrocarbon fraction dissolved therein and it should also be relatively inert to the hydrogen fluoride sludge and to the products of the decomposition of the sludge. If a paraffinic naphtha is employed, its normal boiling point should be from about 100° to about 150° C. so that it may be separated by fractional distillation from the polyolefinic cyclic hydrocarbon fraction which boils generally from about 150° to about 450° C.

One method of carrying out the process of this invention is illustrated as follows:

A polymer gasoline boiling from about 50 to about 200° C. formed by polymerizing propylene and butylenes from a $C_3$–$C_4$ hydrocarbon fraction is contacted with an equal volume of hydrofluoric acid of 90 to 100% concentration in a mixing zone provided with suitable temperature control means and maintained at a temperature of about 60° C. The reaction mixture may also contain hydrofluoric acid previously used in the process and a low boiling saturated hydrocarbon such as a butane fraction, the latter being separated from the final reaction products and recycled to the hydrogen fluoride containing reaction zone. The polymer gasoline feed stock and hydrogen fluoride catalyst are contacted in the mixing zone for a time of from about 1 to about 30 minutes which is generally sufficient to produce a substantially saturated hydrocarbon layer and a hydrogen fluoride catalyst layer containing polyolefinic cyclic hydrocarbons, the latter being associated with the liquid hydrogen fluoride in the form of a chemical complex. From the mixing zone, the resultant reaction mixture is directed to a settling zone, wherein the mixture or emulsion of organic compounds and liquid hydrogen fluoride is permitted to stand and to separate into an upper substantially saturated hydrocarbon layer and a lower hydrofluoric acid catalyst layer. From the settling zone, the hydrofluoric acid catalyst layer containing polyolefinic cyclic hydrocarbons is withdrawn to a catalyst layer separating zone while a substantially saturated hydrocarbon material which separates as an upper layer in the settling zone is direced therefrom to a hydrocarbon layer separating zone. The hydrogen fluoride catalyst layer is then subjected to flash distillation to separate hydrogen fluoride from the polyolefinic cyclic hydrocarbon fraction. The used hydrogen fluoride so separated and recovered is directed at least in part through a recycle line to the original mixing zone while the polyolefinic cyclic hydrocarbon fraction is discharged from the separating zone to storage or to further purification or fractionation treatment. The upper hydrocarbon layer which was separated from the hydrogen fluoride catalyst layer in the settler is then subjected to suitable fractionation to separate as an overhead fraction a mixture of residual dissolved hydrogen fluoride and substantially low boiling hydrocarbons which were introduced to the process or formed during the conversion reaction. If desired, a portion of the low boiling saturated hydrocarbons so recovered may be recycled to commingle with the polymer gasoline and hydrogen fluoride being contacted as aforementioned.

When the polymer gasoline or other olefinic or olefin-acting charging stock does not contain a substantial proportion of saturated hydrocarbons having from 3 to about 8 carbon atoms per molecule, it is advisable to extract the hydrofluoric acid layer with such a solvent before separating the polyolefinic cyclic hydrocarbon fraction from the hydrofluoric acid layer in order to obtain a polyolefinic cyclic hydrocarbon fraction substantially uncontaminated by saturated hydrocarbons of similar boiling range.

Concentrated hydrofluoric acid containing from 90 to 100% hydrogen fluoride is a preferred conjunct polymerization catalyst for use in this process, but other conjunct polymerization catalysts utilizable in the production of the polyolefinic cyclic hydrocarbon fraction include in general certain acid-acting halides such as aluminum bromide and aluminum chloride in their substantially anhydrous forms and used catalytic sludges containing these aluminum halides, also sulfuric acid of at least about 85% concentration, boron trifluoride, and mixtures of boron trifluoride with hydrogen fluoride. In the presence of these other catalysts, conjunct polymerization products are formed which are similar in many (but not all) respects in structure and physical properties to the conjunct polymers formed when hydrogen fluoride is utilized as the catalyst, but the process differs chiefly in the manner of recovering the conjunct polymers from sludges containing these catalysts. Because hydrogen fluoride sludges may be decomposed at such conditions that the catalyst may be recovered in substantially anhydrous condition suitable for recycling to the sludge-forming stage, it is generally preferred in the present process. When catalysts such as aluminum halide, hydrogen fluoride, or sulfuric acid are employed, the saturated hydrocarbon material produced during the conjunct polymerization reaction forms an upper layer while the highly unsaturated cyclic hydrocarbon fraction combines with the catalyst in a lower layer from which the polyolefinic cyclic hydrocarbon fraction employed in my process may be recovered.

The polyolefinic cyclic hydrocarbon fraction employed in preparing the composition of the present invention may be obtained in a number of different ways as aforementioned. For example, it may be derived from the catalyst phase formed in such processes as the alkylation of an isoparaffin with an olefin or other alkylating agent, the polymerization of normally gaseous or liquid olefins and the like. In order to prepare the polyolefinic cyclic hydrocarbon fraction having a high degree of conjugated unsaturation, a number of factors must be considered. The charging stock, as already stated, preferably comprises olefins, olefin-acting compounds, high boiling isoparaffins (such as high boiling alkylate), or a mixture of olefins and saturated substantially nonbenzenoid hydrocarbons containing tertiary hydrogen atoms. As the temperature is increased and as the time is extended at which the catalyst complex is treated, the amount of conjugated unsaturation is decreased in the polyolefinic cyclic hydrocarbon fraction so recovered. To avoid this decrease or disappearance of conjugated olefinic unsaturation, the reaction conditions must be controlled carefully although the conditions at which a catalyst phase containing polyolefinic cyclic hydrocarbons is formed will vary over a relatively wide range. In this treatment, the reaction temperature is generally from about $+10°$ to about 150° C. When employing hydrogen fluoride as a catalyst, reaction temperatures will vary from about $+10°$ to about 150° C. When employing aluminum chloride catalyst, reaction temperatures of from about 25° to about 125° C. are preferred, while with sulfuric acid catalyst the maximum temperature used is generally slightly lower than when using aluminum chloride catalyst because of the oxidizing effect of sulfuric acid at higher temperatures so that a range of about 25° to about 100° C. is preferable.

The polyolefinic cyclic hydrocarbon fraction formed as hereinabove set forth has a wide boiling range of from about 150° to over 450° C., density of about 0.83 to about 0.93, index of refraction of about 1.47 to about 1.53 (but usually 1.48 to 1.50), specific dispersion of about 125 to about 175 (but usually between 135 and 145), bromine numbers above about 140 (although they vary considerably with the average molecular weight), maleic anhydride values of from about 30 to about 90 (usually in the range of about 45 to 75), acid number below 3, average number of olefinic double bonds per molecule varying between about 2.5 to about 4, of which from about 40 to about 70 per cent are conjugated, and excellent solubility in petroleum oils and vegetable oils such as linseed oil or tung oil. The polyolefinic cyclic hydrocarbon fraction has an average molecular weight of from about 200 to about 400, although the usual average is in the neighborhood of 300. However, the polyolefinic cyclic hydrocarbon fraction may comprise components having molecular weights as low as about 150 and as high as about 1,000. Although the hydrogen to carbon atomic ratios in the polyolefinic cyclic hydrocarbon fraction will vary somewhat, depending upon the particular source of the starting material, this ratio is from about 1.67 to about 1.72, while the actual weight per cent of hydrogen varies from about 12.35 to about 12.6% in the case of the polymers recovered from hydrogen fluoride sludges. In case of polyolefinic cyclic hydrocarbon fractions recovered from an aluminum chloride catalyst phase, the hydrogen to carbon atomic ratios range from about 1.58 to about 1.72 with the actual percentage by weight of hydrogen averaging about 12.4.

The physical properties of the polyolefinic cyclic hydrocarbon fraction will vary somewhat depending upon whether the entire boiling range of material or a specific fraction thereof is employed. In general, the lower-boiling fractions have similar properties regardless of the particular catalyst phase from which they are derived and are water-white or straw-yellow in color. The higher-boiling fractions are somewhat darker in color and differ more widely, those derived from hydrogen fluoride catalyst phases being substantially non-aromatic and partly bicyclic or dicyclic, while those derived from catalyst complexes formed in reactions involving such catalysts as aluminum chloride or sulfuric acid contain a certain amount of aromatic hydrocarbons.

The ethylenic compounds used in the preparation of the co-polymer resin of this process are unsymmetrical and contain at least one strongly electronegative group attached to a carbon atom selected from the members of the group consisting of an ethylenic carbon atom and a carbon atom in alpha position to an ethylenic carbon atom.

The ethylenic compounds which contain a strongly electronegative group attached to an ethylenic carbon atom may be represented by the general formula $$H_2C=C-R_1$$
$$\phantom{H_2C=C-}R_2$$

wherein $R_1$ represents a member selected from the group consisting of hydrogen, chlorine, bromine, fluorine, and an alkyl group, and $R_2$ represents a member selected from the group consisting of an aryl group, chlorine, bromine, fluorine, an alkyl carboxy group, an alkyl substituted aryl group, and a halogen substituted aryl group, when $R_1$ is hydrogen; $R_2$ is an aryl group when $R_1$ is an alkyl group; and $R_2$ is a halogen group when $R_1$ is a halogen group. Such ethylenic compounds which contain strongly electronegative groups attached to ethylenic carbon atoms, that is, to one of the carbon atoms joined by a double bond and which are utilizable in this process include vinyl aromatics such as styrene, such substituted styrenes as α-methyl styrene, p-methyl-α-methyl styrene, p-chlorostyrene; indene and substituted indenes; vinyl naphthalenes, and substituted vinyl naphthalenes; halo-ethylenes including vinyl fluoride, chloride, and bromide; and the vinylidene halides such as vinylidene fluoride, chloride, and bromide, as well as 1-fluoro-1-chloroethylene; vinyl esters such as vinyl acetate, etc. The reactivity of the vinyl compounds employed varies, depending upon the relative electronegativity of the substituted vinyl group. For example, p-methyl styrene and p-chlorostyrene undergo reaction more readily than does unsubstituted styrene.

Ethylenic compounds which contain strongly electronegative groups attached to a carbon atom which is in alpha position to one of the double bonded carbon atoms and utilizable in the process may be represented by the general formula:

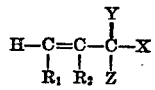

wherein $R_1$ and $R_2$ each represent a member selected from the group consisting of a hydrogen atom and a hydrocarbon radical such as an alkyl group, a cycloalkyl group, an aryl group, or an aryl alkyl group; X represents a member selected from the group consisting of a halogen atom, an aryl group, an alkenoxy group (as C=C—C—O)

an alkylcarboxy group (as CH$_3$—COO—)

an alkenylcarboxy group (as C=C—COO—), an O-alkylcarboxy alkylenecarboxy group (as CH$_3$OOC—(CH$_2$)$_2$COO—)

an O-alkenylcarboxyalkylenecarboxy group (as C=C—COOC—(CH$_2$)$_2$COO—), an O-alkylcarboxyalkenylenecarboxy group (as CH$_3$OOC—CH=CH—COO—)

an O-alkenylcarboxyalkenylenecarboxy group (as C=C—COOCH=CH—COO—), an alkylcarboxyarylenecarboxy group or an O-alkenylcarboxyarylenecarboxy group (as CH$_3$— or

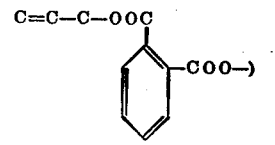

an amino group, an alkylthio group, an alkenylthio group, or an alkylcarboxyamido group (as CH$_3$CONH—), or an alkenylcarboxyamido group (as

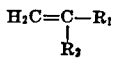

when Y and Z each represents a member selected from the group consisting of a hydrogen atom and an alkyl group; X represents a member selected from the group consisting of an alkoxy (as CH$_3$O—) alkyl, aryl, and alkenyl groups when Y and Z represent a bivalent oxygen atom; and X, Y, and Z together may comprise a trivalent nitrogen atom. The ethylenic compounds which contain strongly electronegative groups attached to a carbon atom in alpha position to one of the carbon atoms of the ethylenic group, as indicated by the above general formula include acrylic esters such as the methyl acrylate; acrylonitrile; substituted acrylic esters such as methyl methacrylate; esters of beta,gamma-unsaturated alcohols with carboxylic acids, either saturated or unsaturated, such as diallyl maleate, diallyl fumarate, diallyl phthalate, diallyl succinate, etc.; amides of allyl amine; diallyl ether; allyl halides, such as, for example, allyl chloride; allylamine; vinyl alkyl ketones, vinyl aryl ketones, and vinyl alkenyl ketones; diallyl thioether; crotyl benzene; and other ethylenic compounds.

The reactivity of the ethylenic compounds employed varies, depending upon the relative electronegativity of the substituent group. The properties of the resulting co-polymer products also vary with the type of substituted ethylenic compound used.

The reaction of the polyolefinic cyclic hydrocarbon fraction and an ethylenic compound as herein set forth can be promoted by heat, light, or the presence of catalyst. Suitable catalysts include acids which are known to be effective in polymerization, such as sulfuric acid, hydrogen fluoride, or phosphoric acid; Friedel-Crafts metal halides, as for example, aluminum chlorides, zinc chloride, ferric chloride, and the like; and peroxide catalysts such as benzoyl peroxide or other oil-soluble peroxides.

The temperatures selected for the co-polymerization reaction depend upon the amount and kind of catalyst used, upon the particular type of ethylenic compound employed and upon the resinous product it is desired to make; in some cases (for example, when the product is to be used for laminating purposes or for the preparation of baking varnishes) it may be desirable to stop the reaction short of the finished state in order that a readily soluble semi-fluid product may be obtained. Temperatures from about 25° C. up to about 300° C. are suitable, with reaction times ranging from several hours to several weeks, depending upon the temperature, the catalyst, and the particular reactants involved. In general, the molecular weight of the product is dependent upon the temperature of polymerization and the amount of catalyst, the highest molecular weight products being obtained with relatively small concentrations of catalyst and at relatively low temperatures with long polymerization times.

In this process, from about 5 to about 95% by weight of the polyolefinic cyclic hydrocarbon fraction is copolymerized with from about 95 to about 5% by weight of the ethylenic compound containing at least one strongly electronegative group attached to a carbon atom selected from the members of the group consisting of an ethylenic carbon atom and a carbon atom in alpha position to an ethylenic carbon atom, but in many cases, more narrowly limited amounts of the ethylenic compound may be included if the product is to be a hard, solid material.

The resultant resinous products may be useful for various purposes depending upon their characteristic properties. Such resinous products are useful in the preparation of decorative and protective coatings, as plastics, as molding powders, as laminates, as adhesives, as extenders of other resins and for related purposes.

The following examples are introduced to illustrate the products of this invention and the methods for preparing them, although these data are not to be misconstrued to limit unduly the generally broad scope of the invention.

*Example I*

A polymer gasoline was reacted with hydrogen fluoride at a temperature of 78° C., pressure of 10.7 atmospheres, and a gasoline: hydrogen fluoride (liquid) volumetric ratio of 4.23:1. After completion of the reaction the products were separated into a hydrocarbon layer and a catalyst layer and the latter was hydrolized with water to yield the polyolefinic cyclic hydrocarbon fraction. The latter was then fractionated and a fraction boiling between 275–320° C. and having the following properties was used in the preparation of a resin.

| | |
|---|---|
| Density ($d_4^{20}$) | 0.856 |
| Index of refraction ($n_D^{20}$) | 1.4829 |
| Specific dispersion | 139 |
| Molecular weight | 257 |
| Bromine number (UOP)[1] | 202 |
| Diene value | 78.5 |
| Number of double bonds/mol. (from bromine number) | 3.36 |
| Number of conjugated double bonds/mol | 1.65 |
| Per cent carbon | 87.74 |
| Per cent hydrogen | 12.35 |

[1] As determined by the UOP Method No. H–44 described in "UOP Laboratory Test Methods for Petroleum and its Products," 1937, 186–7; and in Method H–44–40 given on pp. H–25 and –26 of the 1940 edition of same publication.

Mixtures of this polyolefinic cyclic hydrocarbon fraction with redistilled styrene were prepared to contain 10, 30, 50, 70 and 90 weight per cent of the polyolefinic cyclic hydrocarbon fraction and 0.5 weight per cent of benzoyl peroxide was added to each mixture. The mixtures were subjected to gradually increasing temperatures, namely, 25° C., 50° C., 80° C., 110° C., 140° C., 180° C., and 220° C.

Mixtures containing up to 30% by weight of the polyolefinic cyclic hydrocarbon fraction were polymerizable to solid copolymers at the conditions employed, and particularly at temperatures from 110° C. to 220° C.; at 110° C., about 2 to 4 days are required for the polymerization while at 220° C. less than a day is adequate. These products were clear, hard, thermoplastic resins, more tough than pure polystyrene. Although thermoplastic, they are capable of vulcanization since the polyolefinic cyclic hydrocarbon fraction employed in its production introduces unsaturated linkages which may be reacted with sulfur and vulcanization accelerators.

*Example II*

A portion of the polyolefinic cyclic hydrocarbon fraction formed as indicated in Example I was mixed with the following ethylenic compounds, namely diallyl maleate, acrylonitrile, methyl acrylate, diallyl phthalate, and diallyl succinate. With each ethylenic compound, five mixtures were prepared containing 10, 30, 50, 70 and 90 weight per cent of the polyolefinic cyclic hydrocarbon fraction, the remainder being one of the ethylenic compounds mentioned above. The resultant mixtures were subjected to gradually increasing temperatures starting with 25° C., and covering the series 50° C., 80° C., 110° C., 140° C., 180° C., and 220° C. The products obtained in these runs are indicated in the following table:

| Charged Ethylenic Compound | Amount of polyolefinic cyclic hydrocarbon fraction compatible with the ethylenic compound, per cent by weight of mixture | Minimum Temperature of Polymerization, ° C. | Time of Polymerization, hours | Description of Co-Polymers |
|---|---|---|---|---|
| Diallyl maleate | Up to 70 | 180 | 120 | Hard, clear, with up to 30% polyolefinic cyclic hydrocarbon fraction. Soft, clear solid with up to 70% polyolefinic cyclic hydrocarbon fraction. |
| Acrylonitrile | ----do---- | 110 | 120 | Hard, opaque with up to 70% polyolefinic cyclic hydrocarbon fraction. |
| Methylacrylate | Less than 30 | 140 | 120 | Soft, transparent solid. |
| Diallyl phthalate | Up to 50 | 140 | 120 | Do. |
| Diallyl succinate | Less than 30 | 205 | 96 | Soft, jellylike. |

The foregoing table relates to the amounts of the polyolefinic cyclic hydrocarbon fraction that could be incorporated with diallyl maleate, acrylonitrile, methylacrylate, diallyl phthalate, and diallyl succinate to give homogeneous products. Such amounts of the polyolefinic cyclic hydrocarbon fraction are indicated as compatible with the diallyl maleate or other ethylenic compounds containing strongly electronegative substituents that are copolymerized with the polyolefinic cyclic hydrocarbon fraction. As indicated in the table, suitable reaction times for obtaining copolymers of the above described type at the indicated polymerization temperatures are about 120 hours in the case of diallyl maleate, acrylonitrile, methyl acrylate, and diallyl phthalate and about 96 hours in the case of copolymers of diallyl succinate and the polyolefinic cyclic hydrocarbon fraction.

I claim as my invention:

1. A resinous material comprising the copolymerization product of (1) from about 5 to about 95% by weight of an ethylenic compound selected from the group consisting of vinyl aromatics, indenes, monohalo-ethylenes, vinylidene halides, vinyl esters, acrylic and substituted acrylic esters, acrylonitrile, esters of beta,gamma-unsaturated alcohols with carboxylic acids, amides of allyl amine, diallyl ether, allyl halides, allylamine, diallyl thioether and crotyl benzene with (2) from about 95 to 5% by weight of a mixture of polyolefinic cyclic hydrocarbons boiling in the range of from about 150° to about 450° C. and containing an average of from about 2.5 to about 4 double bonds per molecule, of which from about 40 to about 70% are conjugated, said polyolefinic cyclic hydrocarbon mixture having a bromine number of above about 140, a density of from about 0.83 to about 0.93, an acid number below 3, and a maleic anhydride value of from about 30 to about 90.

2. The resinous material of claim 1 further characterized in that said polyolefinic cyclic hydrocarbon mixture has a boiling range of from about 275° to about 320° C.

3. The resinous material of claim 1 further characterized in that an electronegative group of said ethylenic compound is attached to an ethylenic carbon atom.

4. The resinous material of claim 1 further characterized in that an electronegative group of said ethylenic compound is attached to a carbon atom in alpha position to an ethylenic carbon atom.

5. The resinous material of claim 1 further characterized in that said ethylenic compound is a vinyl aromatic.

6. The resinous material of claim 1 further characterized in that said ethylenic compound is styrene.

7. The resinous material of claim 1 further characterized in that said ethylenic compound is an ester of a beta,gamma-unsaturated alcohol with a carboxylic acid.

8. The resinous material of claim 1 further characterized in that said ethylenic compound is diallyl maleate.

9. The resinous material of claim 1 further characterized in that said ethylenic compound is acrylonitrile.

HERMAN S. BLOCH.

REFERENCES CITED

The following references are of record in the file of this patent:

UNITED STATES PATENTS

| Number | Name | Date |
|---|---|---|
| 1,939,932 | Thomas | Dec. 19, 1933 |
| 2,047,398 | Voss et al. | July 14, 1936 |
| 2,129,478 | Rohm | Sept. 6, 1938 |
| 2,142,980 | Huijser et al. | Jan. 3, 1939 |
| 2,313,728 | Austin | Mar. 16, 1943 |
| 2,354,775 | Rummelsburg | Aug. 1, 1944 |

OTHER REFERENCES

Ipatieff et al., articles in Jour. Am. Chem. Soc., vol. 58, pages 915–917.